(12) United States Patent
Yang et al.

(10) Patent No.: US 8,042,821 B2
(45) Date of Patent: Oct. 25, 2011

(54) EXTENDING AND RETRACTING DEVICE AND VEHICLE STEP APPARATUS WITH THE SAME

(75) Inventors: Huizhong Yang, Hang Zhou (CN); Lingling Yang, Hang Zhou (CN)

(73) Assignee: T-Max (Hangzhou) Industrial Co., Ltd. (CN)

( * ) Notice: Subject to any disclaimer, the term of this patent is extended or adjusted under 35 U.S.C. 154(b) by 621 days.

(21) Appl. No.: 12/140,595

(22) Filed: Jun. 17, 2008

(65) Prior Publication Data
US 2009/0295115 A1 Dec. 3, 2009

(30) Foreign Application Priority Data
Jun. 3, 2008 (CN) .......................... 2008 1 0110562

(51) Int. Cl.
*B60R 3/00* (2006.01)
*B60R 3/02* (2006.01)
(52) U.S. Cl. ....................................... 280/166; 280/163
(58) Field of Classification Search ................. 180/90.6; 280/163, 164.1, 165, 166
See application file for complete search history.

(56) References Cited

U.S. PATENT DOCUMENTS

| | | | | | |
|---|---|---|---|---|---|
| 32,460 | A | * | 6/1861 | Betts | 280/166 |
| 115,664 | A | * | 6/1871 | Vollhardt | 280/166 |
| 125,235 | A | * | 4/1872 | Wells | 280/166 |
| 752,031 | A | * | 2/1904 | Chadwick | 280/166 |
| 1,052,364 | A | * | 2/1913 | Morris | 105/449 |
| 1,146,559 | A | * | 7/1915 | Fuller | 105/437 |
| 1,182,563 | A | * | 5/1916 | Coop | 182/89 |
| 1,487,408 | A | * | 3/1924 | Tichy | 280/166 |
| 2,118,557 | A | * | 5/1938 | Hamilton | 280/166 |
| 2,764,422 | A | * | 9/1956 | McDonald | 182/91 |
| 3,528,574 | A | * | 9/1970 | Denner et al. | 414/558 |
| 3,833,240 | A | * | 9/1974 | Weiler | 280/166 |
| 3,887,217 | A | * | 6/1975 | Thomas | 280/166 |
| 3,955,827 | A | * | 5/1976 | Wonigar | 280/166 |
| 4,073,502 | A | * | 2/1978 | Frank et al. | 280/166 |
| 4,110,673 | A | * | 8/1978 | Magy et al. | 318/466 |
| 4,982,974 | A | * | 1/1991 | Guidry | 280/164.2 |
| 5,538,269 | A | * | 7/1996 | McDaniel et al. | 280/166 |

(Continued)

FOREIGN PATENT DOCUMENTS

CA 2438489 A 10/2002

(Continued)

*Primary Examiner* — J. Allen Shriver, II
*Assistant Examiner* — Jacob Meyer
(74) *Attorney, Agent, or Firm* — Bliss McGlynn, P.C.

(57) ABSTRACT

An extending and retracting device for a vehicle step includes a mounting bracket adapted to be fixed to a vehicle body and a step bracket adapted to be connected to a step member of the vehicle step. First and second arms each defines a lower end portion connected to the step bracket and an upper end portion. A third arm defines an upper end portion rotatably connected to the mounting bracket and a lower end portion rotatably connected to the upper end portion of the first or second arm. The upper end portion of the other of the first or second arm is rotatably connected to the mounting bracket. At least one arc-sliding member is mounted to the step bracket. At least one arc slot is formed in the lower end portion of the second arm. The arc-sliding member is adapted to fit into the corresponding arc slot so as to be slidable in the arc slot so that the lower end portion of the second arm is rotatable with respect to the step bracket.

13 Claims, 13 Drawing Sheets

U.S. PATENT DOCUMENTS

| | | | | |
|---|---|---|---|---|
| 6,027,090 | A * | 2/2000 | Liu | 248/281.11 |
| 6,641,158 | B2 * | 11/2003 | Leitner | 280/166 |
| 6,830,257 | B2 * | 12/2004 | Leitner | 280/166 |
| 6,834,875 | B2 * | 12/2004 | Leitner et al. | 280/166 |
| 6,938,909 | B2 * | 9/2005 | Leitner | 280/166 |
| 6,942,233 | B2 * | 9/2005 | Leitner et al. | 280/166 |
| 7,005,839 | B2 | 2/2006 | Wada | 280/166 |
| 7,007,961 | B2 * | 3/2006 | Leitner et al. | 280/166 |
| 7,055,839 | B2 * | 6/2006 | Leitner | 280/166 |
| 7,118,120 | B2 | 10/2006 | Lee et al. | 280/166 |
| 7,163,221 | B2 | 1/2007 | Leitner | 280/166 |
| 7,287,771 | B2 * | 10/2007 | Lee et al. | 280/166 |
| 7,367,574 | B2 | 5/2008 | Leitner | 280/166 |
| 7,380,807 | B2 * | 6/2008 | Leitner | 280/166 |
| 7,398,985 | B2 * | 7/2008 | Leitner et al. | 280/166 |
| 7,413,204 | B2 * | 8/2008 | Leitner | 280/163 |
| 7,441,790 | B2 * | 10/2008 | Lechkun | 280/166 |
| 7,487,986 | B2 * | 2/2009 | Leitner et al. | 280/166 |
| 7,566,064 | B2 * | 7/2009 | Leitner et al. | 280/166 |
| 7,584,975 | B2 * | 9/2009 | Leitner | 280/166 |
| 7,621,546 | B2 * | 11/2009 | Ross et al. | 280/166 |
| 7,712,755 | B2 * | 5/2010 | Yang et al. | 280/163 |
| 7,740,260 | B2 * | 6/2010 | VanBelle et al. | 280/166 |
| 7,740,261 | B2 * | 6/2010 | Leitner et al. | 280/166 |
| 7,744,106 | B2 * | 6/2010 | VanBelle et al. | 280/166 |
| 2002/0113400 | A1 * | 8/2002 | Leitner | 280/166 |
| 2003/0184040 | A1 * | 10/2003 | Leitner | 280/166 |
| 2004/0084868 | A1 * | 5/2004 | Leitner et al. | 280/166 |
| 2004/0124601 | A1 * | 7/2004 | Leitner | 280/166 |
| 2005/0077697 | A1 * | 4/2005 | Leitner | 280/166 |
| 2005/0087951 | A1 * | 4/2005 | Leitner et al. | 280/166 |
| 2005/0104318 | A1 * | 5/2005 | Lee et al. | 280/166 |
| 2005/0179227 | A1 * | 8/2005 | Leitner | 280/163 |
| 2005/0280242 | A1 * | 12/2005 | Fabiano et al. | 280/164.1 |
| 2006/0091638 | A1 * | 5/2006 | Leitner et al. | 280/166 |
| 2006/0125204 | A1 * | 6/2006 | Leitner et al. | 280/166 |
| 2006/0202441 | A1 * | 9/2006 | Leitner | 280/163 |
| 2007/0108720 | A1 * | 5/2007 | Leitner | 280/166 |
| 2007/0278760 | A1 * | 12/2007 | VanBelle et al. | 280/166 |
| 2008/0054586 | A1 * | 3/2008 | Lechkun | 280/166 |
| 2008/0100024 | A1 * | 5/2008 | Leitner et al. | 280/166 |
| 2008/0100025 | A1 * | 5/2008 | Leitner et al. | 280/166 |
| 2008/0116653 | A1 * | 5/2008 | Piotrowski | 280/166 |
| 2008/0191445 | A1 * | 8/2008 | Yang et al. | 280/166 |
| 2008/0271936 | A1 * | 11/2008 | Kuntze et al. | 180/90.6 |
| 2008/0290626 | A1 * | 11/2008 | Leitner | 280/166 |
| 2009/0072508 | A1 * | 3/2009 | Leitner et al. | 280/166 |
| 2009/0250896 | A1 * | 10/2009 | Watson | 280/166 |
| 2010/0059962 | A1 * | 3/2010 | Leitner et al. | 280/166 |

FOREIGN PATENT DOCUMENTS

| | | |
|---|---|---|
| CA | 2463717 A | 5/2003 |
| CA | 2475492 A | 1/2005 |
| CN | 1652955 A | 8/2005 |
| CN | 101020434 A | 8/2007 |
| JP | 8-132967 A | 5/1996 |
| WO | WO02/085670 A2 | 10/2002 |
| WO | WO 03/039910 | 5/2003 |

* cited by examiner

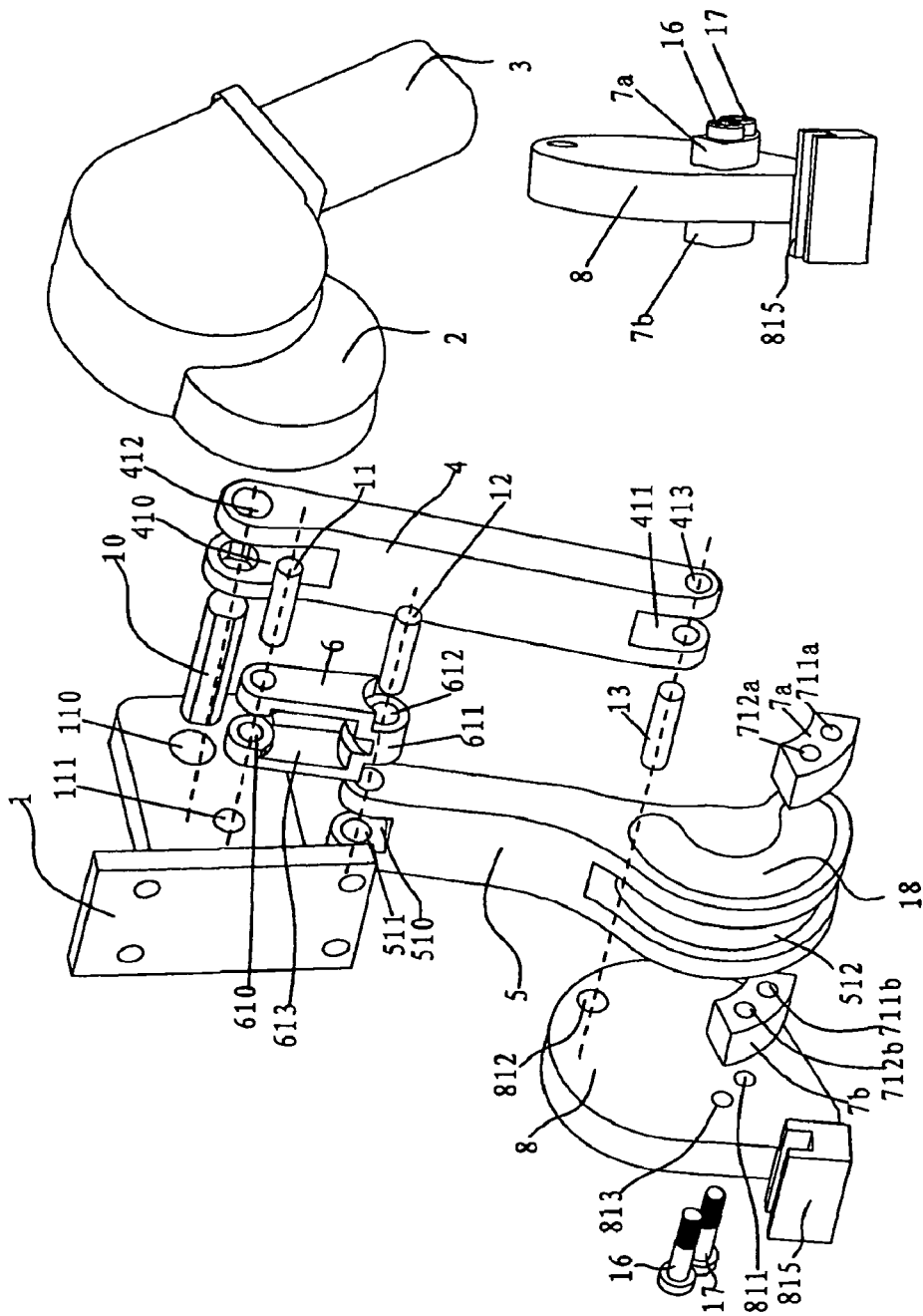

EXTENDING AND RETRACTING DEVICE AND VEHICLE STEP APPARATUS WITH THE SAME

BACKGROUND OF THE INVENTION

1. Field of the Invention

The present invention relates, generally, to a vehicle body and, more particularly, to an extending and retracting device for a step of the vehicle body.

2. Description of the Related Art

A step under a door of a vehicle is used for a passenger to get on or off the vehicle. In terms of ergonomics, the vehicle step is generally mounted at a level of 15 cm with respect to the ground so that it is convenient for the passenger to get on or off it, but this level does not provide sufficient ground clearance during operation of many vehicles. The level of the vehicle step should be higher than ground clearance of the vehicle. Therefore, it is difficult to meet ground-clearance and convenience requirements simultaneously with a conventional vehicle step.

U.S. Pat. No. 6,830,257 discloses a retractable vehicle step employing a four-link mechanism. When a door of a vehicle is opened, the vehicle step is automatically extended out downwardly from the chassis of the vehicle near the board of the body of the vehicle so that a passenger can step on the extended vehicle step. When the vehicle door is closed, the vehicle step is automatically retracted upwardly to its original position, thus not affecting disadvantageously ground clearance of the vehicle.

The retractable vehicle step disclosed in U.S. Pat. No. 6,830,257 employs one motor to drive a pair of four-link mechanisms used to deploy and retract a step member. Since the pair of four-link mechanisms is driven by one motor, a driving force applied to the retractable vehicle step is not balanced, and rotations of two four-link mechanisms of the retractable vehicle step are not synchronous so that operation of the retractable vehicle step is not reliable. If a conventional four-link retractable vehicle step employs two motors to drive the two four-link mechanisms simultaneously, rotations of the two motors and/or four-link mechanisms may not be synchronous so that the four-link mechanisms may interfere with each other. The retractable vehicle step may be destroyed due to the interference and fail to operate.

Furthermore, in a conventional vehicle step apparatus, a distance between two pivot shafts connecting the four-link mechanism with the step member is short so that stress tends to concentrate on respective positions of the pivot shafts when a passenger steps on an extended step member. Thus, the pivot shafts tend to be destroyed over time due to their lack of mechanical strength. Therefore, reliability is reduced, and cost is increased.

Thus, there is a need in the related art for a vehicle step apparatus that is stable and not subject to these deficiencies and operation of which is reliable. There is also a need in the related art for such a vehicle step apparatus that does not increase cost.

SUMMARY OF THE INVENTION

The present invention overcomes the disadvantages in the related art in an extending and retracting device for a vehicle step apparatus. The extending and retracting device includes a mounting bracket adapted to be fixed to a body of a vehicle. A step bracket is adapted to be connected to a step member of the vehicle step apparatus. A first arm defines a lower end portion thereof rotatably connected to the step bracket and an upper end portion thereof. A second arm defines a lower end portion thereof connected to the step bracket and an upper end portion thereof. A third arm defines an upper end portion thereof rotatably connected to the mounting bracket and a lower end portion thereof rotatably connected to the upper end portion of the first or second arm. The upper end portion of the other of the first or second arm is rotatably connected to the mounting bracket. At least one arc-sliding member is mounted to the step bracket. At least one arc slot is formed in the lower end portion of the second arm. The arc-sliding member is adapted to fit into the corresponding arc slot so as to be slidable in the arc slot so that the lower end portion of the second arm is rotatable with respect to the step bracket.

One advantage of the vehicle step apparatus of the present invention is that it employs a five-link mechanism, is reliable and stable with a long operational life, does not increase cost, and eliminates interference occurring between the two extending and retracting devices.

Another advantage of the vehicle step apparatus of the present invention is that its freedom of movement is increased and it employs the two driving devices to drive respectively the two extending and retracting devices with increased driving force.

Another advantage of the vehicle step apparatus of the present invention is that even if rotations of the two driving devices and/or extending and retracting devices are not synchronous, asynchronization can be compensated by relative rotation between the third arm and first or second arm.

Another advantage of the vehicle step apparatus of the present invention is that the arc-sliding member(s) and arc slot(s) are cost-effective and efficient to facilitate extending and retracting action of the vehicle-step apparatus.

Another advantage of the vehicle step apparatus of the present invention is that end portions of each arc slot limit movement of the corresponding arc-sliding member within the arc slot and buffer impact of the arc-sliding member against the arc slot.

Another advantage of the vehicle step apparatus of the present invention is that it produces an internal self-locking force that produces a balanced stage when the vehicle step apparatus is in an extended position.

Another advantage of the vehicle step apparatus of the present invention is that the arc-sliding member(s) and arc slot(s) eliminate stress concentration so that useful life of the vehicle step apparatus is long.

Another advantage of the vehicle step apparatus of the present invention is that it distributes stress evenly with a buffering structure that is structurally simple and is relatively lightweight and more aesthetically pleasing.

Other objects, features, and advantages of the present invention will be readily appreciated as the same becomes better understood while reading the subsequent description taken in conjunction with the accompanying drawings.

BRIEF DESCRIPTION OF THE DRAWINGS

FIG. 6 is an exploded schematic view of a fourth embodiment of the extending and retracting device for a vehicle step apparatus of the present invention.

FIG. 7 is a schematic view showing the arc-sliding member mounted onto the step bracket of the fourth embodiment of the extending and retracting device for a vehicle step apparatus of the present invention.

DETAILED DESCRIPTION OF THE INVENTION

An extending and retracting device for a vehicle step apparatus of the present invention is shown in FIGS. 1 through 12, and a vehicle step apparatus using the extending and retracting device is shown in FIGS. 13 through 18. In the figures, like numerals are used to designate like structure throughout various embodiments of each of the device and apparatus disclosed herein. Embodiments of the extending and retracting device and the vehicle step apparatus using the device of to the present invention are described hereinafter with reference to the figures. The embodiments are exemplary only and cannot be construed to limit the present invention. In the description of the present invention that follows, it should be noted that the terminologies "first," "second," "third," "upper," and "lower" are used only to describe the present invention conveniently and cannot be construed to limit the present invention. Although the extending and retracting device is designed to be used in connection with the vehicle step apparatus described below, those having ordinary skill in the related art should appreciate that the extending and retracting device can be used in connection with any suitable vehicle step.

Figure 1:
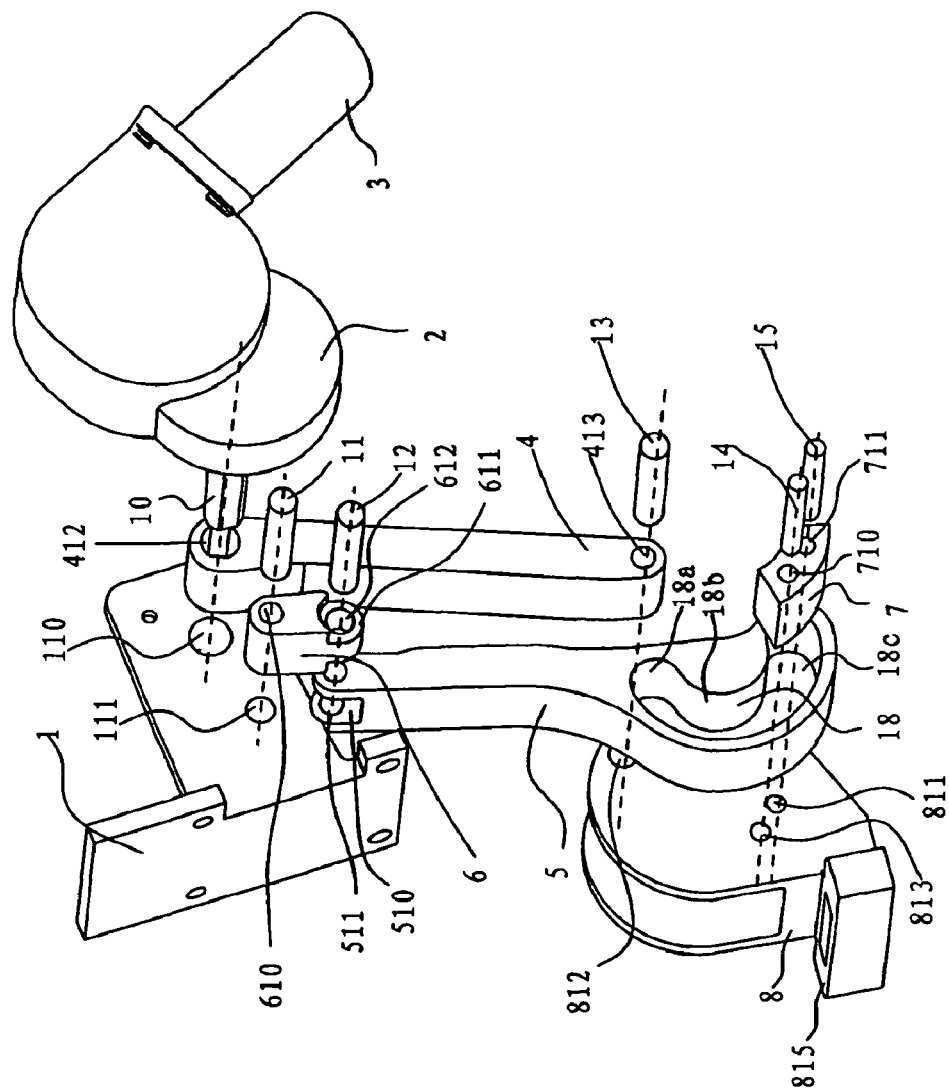
FIG. 1 is an exploded schematic view of a first embodiment of the extending and retracting device for a vehicle step apparatus of the present invention.
Figure 3:
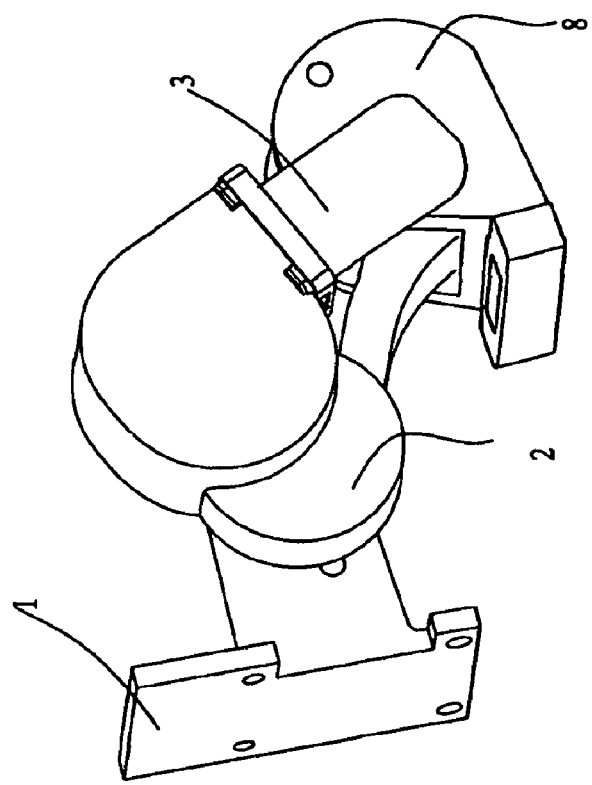
FIG. 3 is a schematic view of the first embodiment of the extending and retracting device for a vehicle step apparatus of the present invention shown disposed in a retracted state.
Figure 2:
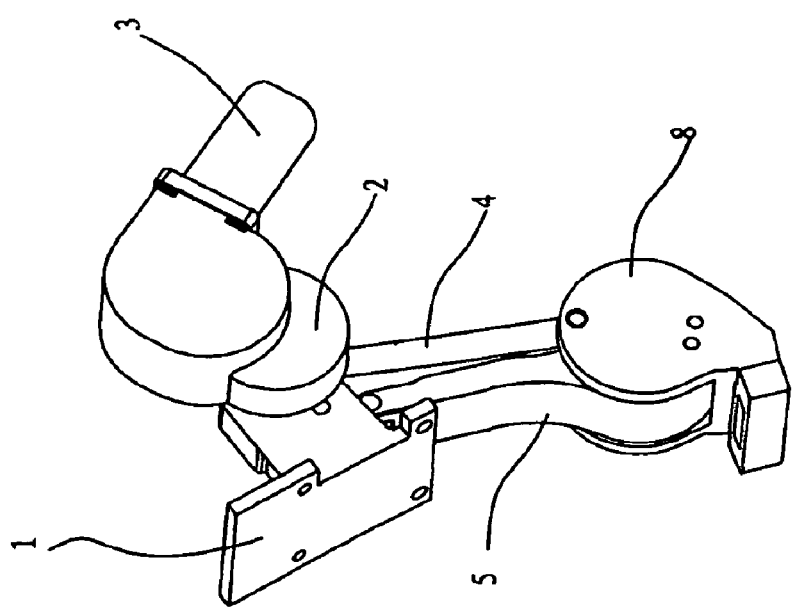
FIG. 2 is a schematic view of the first embodiment of the extending and retracting device for a vehicle step apparatus of the present invention shown disposed in an extended state.
Figure 12:
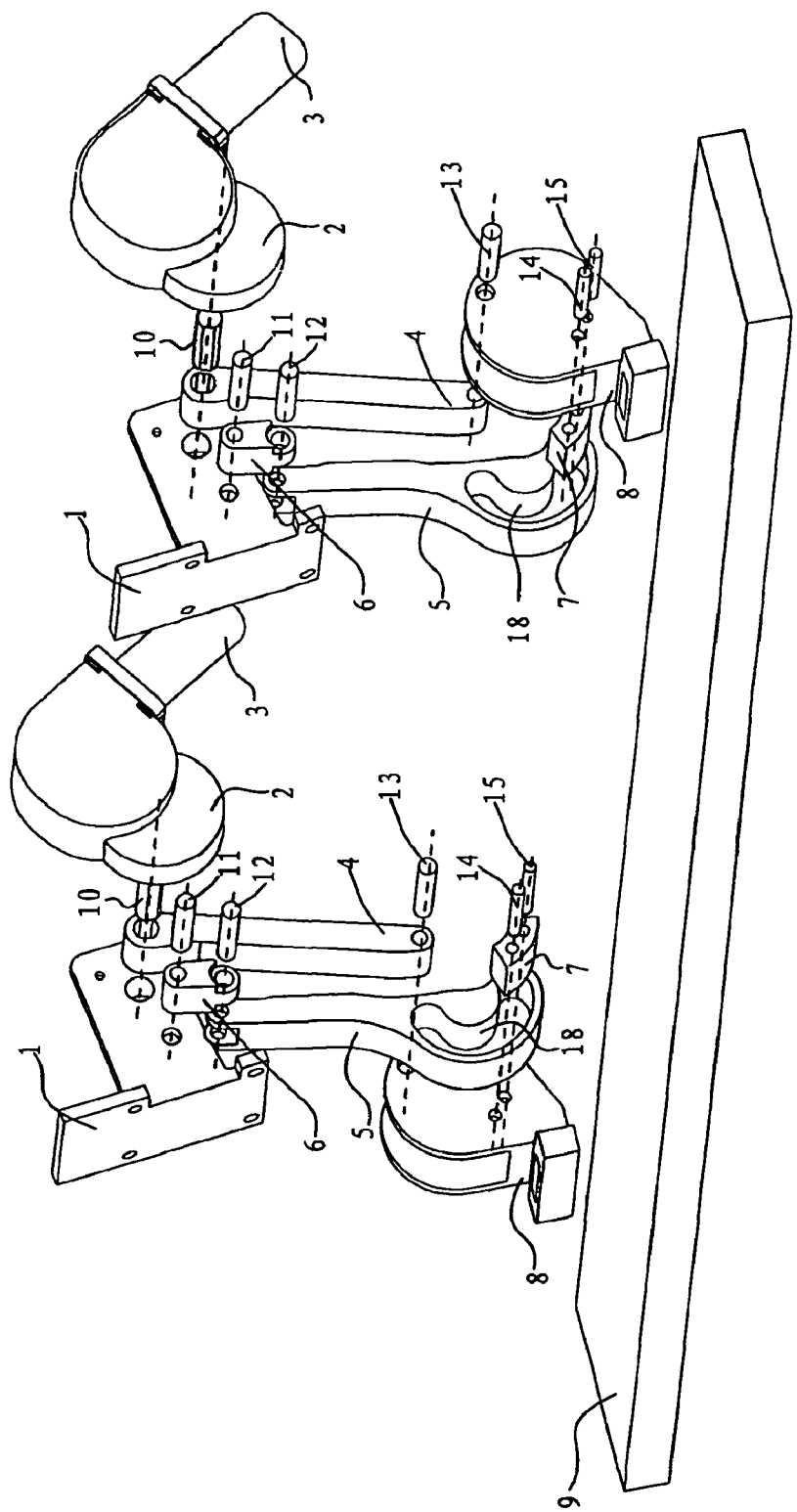
FIG. 12 is an exploded schematic view of a first embodiment of a vehicle step apparatus with the extending and retracting device of the present invention.

With reference to FIGS. 1-3, a first embodiment of the extending and retracting device for a vehicle step apparatus of the present invention will now be described. The first embodiment generally includes a mounting bracket 1 adapted to be fixed to a body of a vehicle (not shown). A step bracket 8 is adapted to be connected to a step member 9 (as shown in FIG. 12) of the vehicle step apparatus. A first arm 4 defines a lower end portion rotatably connected to the step bracket 8 and an upper end portion. A second arm 5 defines a lower end portion connected to the step bracket 8 and an upper end portion. A third arm 6 defines an upper end portion rotatably connected to the mounting bracket 1 and a lower end portion rotatably connected to the upper end portion of the first arm 4 or second arm 5. The upper end portion of the other of the first arm 4 or second arm 5 is rotatably connected to the mounting bracket 1. At least one arc-sliding member 7 is mounted to the step bracket 8. At least one arc slot 18 is formed in the lower end portion of the second arm 5. The arc-sliding member 7 is adapted to fit into the corresponding arc slot 18 so as to be slidable in the arc slot 18 so that the lower end portion of the second arm 5 is rotatable with respect to the step bracket 8. The mounting bracket 1 can be mounted to the body of the vehicle so as to mount the extending and retracting device onto the vehicle.

More specifically and as shown in FIG. 1, the lower end portion of the first arm 4 is rotatably connected to the step bracket 8. In particular, the lower end portion of the first arm 4 is formed with through-hole 413, and a pair of side walls of the step bracket 8 are formed respectively with through-holes 812. Pin 13 is received in through-holes 413, 812 so that the first arm 4 is pivotably connected via pin 13 to the step bracket 8.

The upper end portion of the first arm 4 is rotatably connected to the mounting bracket 1. In particular, the upper end portion of the first arm 4 is formed with through-hole 412, and the mounting bracket 1 is formed with through-hole 110. Pin 10 is received in through-holes 412, 110 so that the upper end portion of the first arm 4 is pivotably connected via pin 10 to the mounting bracket 1.

The lower end portion of the third arm 6 is rotatably connected to the upper end portion of the second arm 5. In particular, the lower end portion of the third arm 6 is formed as a width-reduced protrusion portion 611, and the upper end portion of the second arm 5 is formed with a groove 510 so that the protrusion portion 611 is rotatably inserted into the groove 510. More particularly, each of a pair of side walls of the upper end portion of the second arm 5 defined by the groove 510 is formed with through-hole 511, and the protrusion portion 611 is formed with through-hole 612. Pin 12 is received in through-holes 511, 612 so that the lower end portion of the third arm 6 is pivotably connected via pin 12 to the upper end portion of the second arm 5.

The upper end portion of the third arm 6 is formed with through-hole 610, and the mounting bracket 1 is formed with through-hole 111. Pin 11 is received in through-holes 610, 111 so that the upper end portion of the third arm 6 is pivotably connected via pin 11 to the mounting bracket 1.

The step member 9 can be mounted onto the step bracket 8. In particular, the step bracket 8 is formed with an extension portion 815 at a lower end of the step bracket 8 so that the step member 9 can be mounted onto the extension portion 815.

The arc-sliding member 7 is mounted to the step bracket 8. In particular, the step bracket 8 is formed with through-holes 811, 813, and the arc-sliding member 7 is formed with through-holes 711, 710. Pin 15 is received in through-holes 711, 811, and pin 14 is received in through-holes 710, 813 so that the arc-sliding member 7 is mounted to the step bracket 8 and received in the arc slot 18 formed in the lower end portion of the second arm 5. The arc-sliding member 7 is slidable in the arc slot 18 so that the lower end portion of the second arm 5 can rotate relative to the step bracket 8.

The arc slot 18 is divided into three portions: two end portions 18a, 18c, and an intermediate portion 18c defined between the end portions 18a, 18b. In order to reduce impact of the arc-sliding member 7 on the arc slot 18, a curvature radius of each end portion 18a, 18c is smaller than that of the intermediate portion 18b. When the arc-sliding member 7 is sliding in the arc slot 18, the arc-sliding member 7 fits in the end portions 18a, 18c at a time when the extending and retracting device is respectively in an extended state and a retracted state. Since the curvature radius of each of the end portions 18a, 18c is smaller than that of the intermediate portion 18c, the arc-sliding member 7 fits in the arc slot 18 more tightly at each of the end portions 18a, 18c than at the intermediate portion 18b, thus reducing impact of the arc-sliding member 7 on the arc slot 18 and slowing speed of the arc-sliding member 7. However, those having ordinary skill in the related art should appreciate that the curvature radius of the arc slot 18 may be substantially uniform.

The extending and retracting device includes also a driving device for driving the extending and retracting device. In one embodiment, the driving device may include a reversible motor 3 and a speed reducer 2. In particular, an output shaft of the speed reducer 2 is connected to pin 10 so as to drive pin 10 and cause the first arm 4 to rotate so that the driving device drives the first arm 4 to move the extending and retracting device between the extended and retracted states. In this way, the step member 9 is moved between an extended position and a retracted position.

Figure 13:
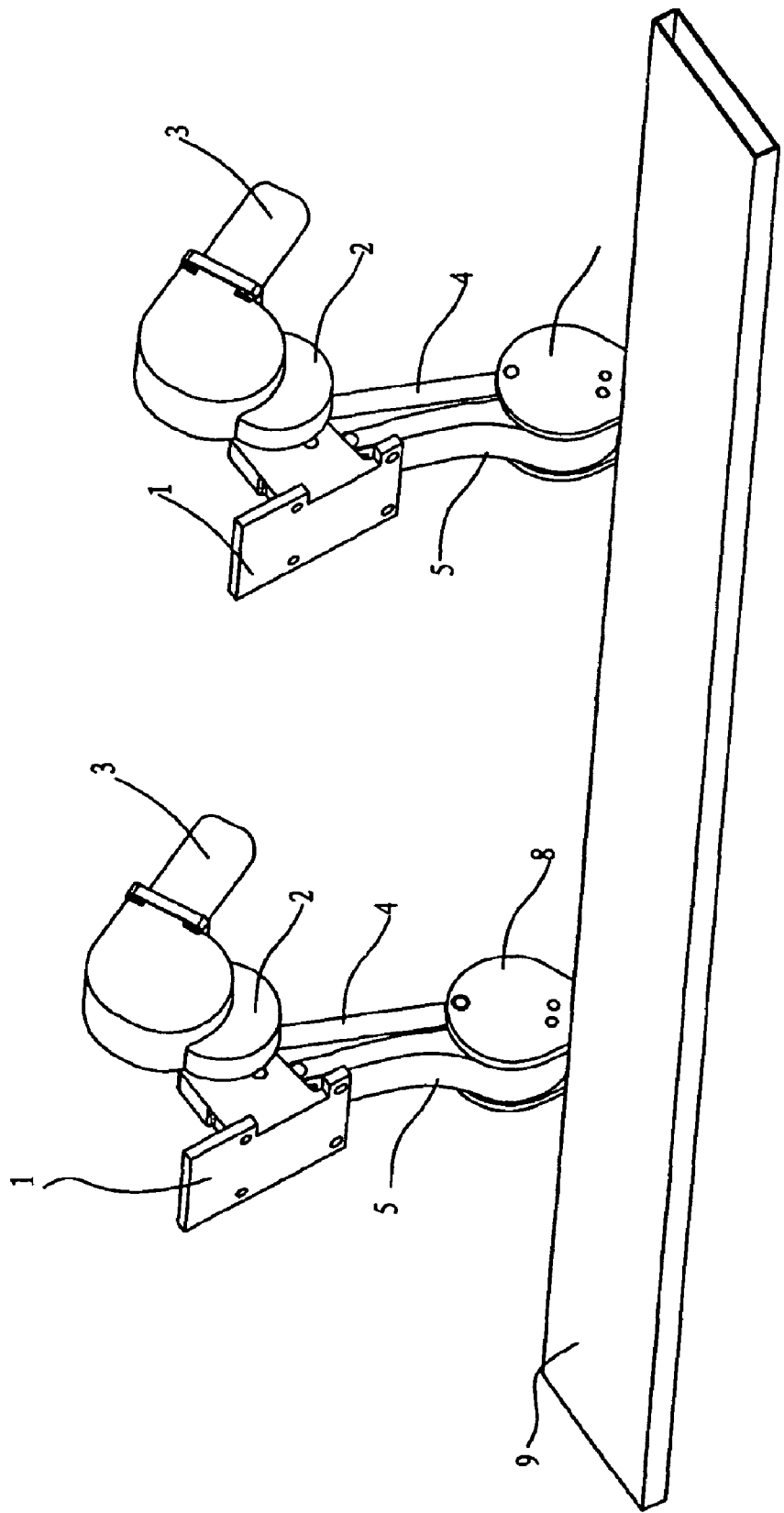
FIG. 13 is a schematic view of the first embodiment of the vehicle step apparatus with the extending and retracting device of the present invention shown disposed in an extended state with the step member being in an extended position.
Figure 14:
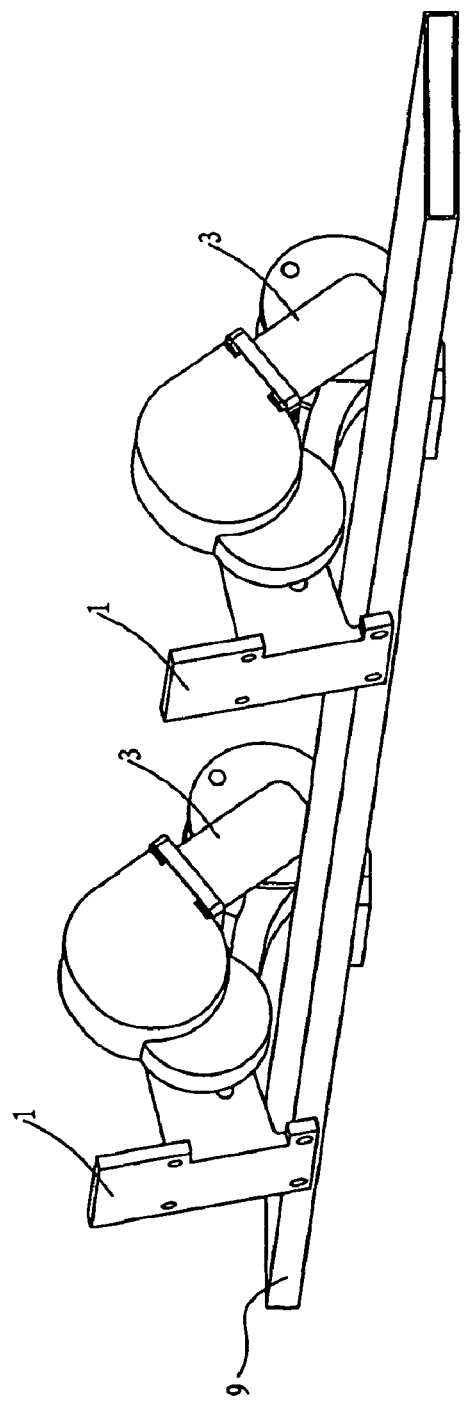
FIG. 14 is a schematic view of the first embodiment of the vehicle step apparatus with the extending and retracting device of the present invention shown disposed in a retracted state with the step member being in a retracted position.

FIG. 2 shows the first embodiment disposed in the extended state in which the step member 9 is connected to the step bracket 8 in the extended position (as shown in FIG. 13). FIG. 3 shows the first embodiment disposed in the retracted state in which the step member 9 is connected to the step bracket 8 in the retraced position (as shown in FIG. 14).

In operation of the first embodiment and as shown in FIGS. 2 and 3, when it is required to move the extending and retracting device from the extended state (as shown in FIG. 2) to the retracted state (as shown in FIG. 3), the reversible motor 3 rotates the first arm 4 in counterclockwise direction (as viewed in FIG. 3) with respect to the mounting bracket 1 via the speed reducer 2, thus driving the second arm 5 and third arm 6 to rotate with respect to the mounting bracket 1. When the second arm 5 rotates, the arc-sliding member 7 slides in the arc slot 18 so that the step bracket 8 moves upwardly and rearwardly with respect to the mounting bracket 1. In this way, the extending and retracting device moves to the retracted state (as shown in FIG. 3). Through reversed rotation of the motor 3, the extending and retracting device can move from the retracted state (as shown in FIG. 3) to the extended state (as shown in FIG. 2).

It should be appreciated by those having ordinary skill in the related art that in the first embodiment of the extending and retracting device, each of the mounting bracket 1, speed reducer 2, reversible motor 3, first arm 4, second arm 5, third arm 6, arc-sliding member 7, step bracket 8, pins 10, 11, 12, 13, 14, 15, protrusion portion 611, and extension portion 815 can have any suitable shape, size, and structure. It should also be appreciated that each of the arc slot 18, through-holes 110, 111, 412, 413, 511, 610, 612, 710, 711, 811, 812, 813, and groove 510 can have any suitable shape and size. It should also be appreciated that the curvature radius of each of the portions 18a, 18b, 18c of the arc slot 18 can have any suitable size. It should also be appreciated that each of the mounting bracket 1, speed reducer 2, reversible motor 3, first arm 4, second arm 5, third arm 6, arc-sliding member 7, step bracket 8, step member 9, pins 10, 11, 12, 13, 14, protrusion portion 611, extension portion 815, arc slot 18, through-holes 110, 111, 412, 413, 511, 610, 612, 710, 711, 811, 812, 813, groove 510, and portions 18a, 18b, 18c of the arc slot 18 can have any suitable structural relationship with each other and the step member 9 and body of the vehicle.

Figure 4:
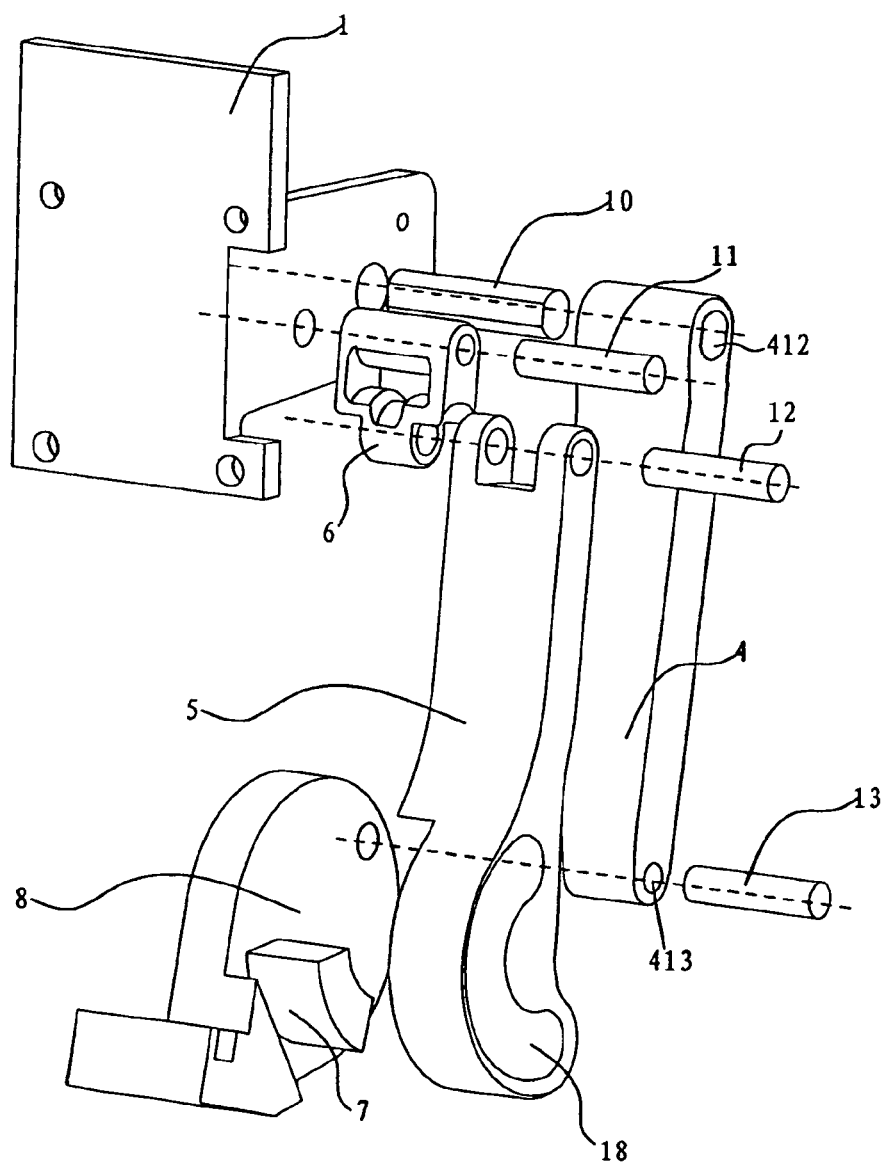
FIG. 4 is an exploded schematic view of a second embodiment of the extending and retracting device for a vehicle step apparatus of the present invention.

With reference to FIG. 4, a second embodiment of the extending and retracting device for a vehicle step apparatus of the present invention will now be described. Those having ordinary skill in the related art should appreciate that structure and operation of the second embodiment is similar to those of the first embodiment. Accordingly, the description that follows focuses upon differences between the first and second embodiments.

In the second embodiment, the arc-sliding member 7 is mounted to a side wall of the step bracket 8—for example, fixed thereto via bolts or welding. Then, the arc-sliding member 7 is extended into the arc slot 18 in the lower end portion of the second arm 5 and slidable in the arc slot 18 such that the step bracket 8 may be juxtaposed and connected to the lower end portion of the second arm 5. Therefore, the lower end portion of the second arm 5 is rotatable with respect to the step bracket 8. The term "juxtaposed" as used herein means that the respective lower end portions of the first arm 4 and second arm 5 are connected to the step bracket 8 side by side with respect to each other. Otherwise, the second embodiment illustrated in FIG. 4 functions the same as the first embodiment illustrated in FIGS. 1-3.

Figure 5:
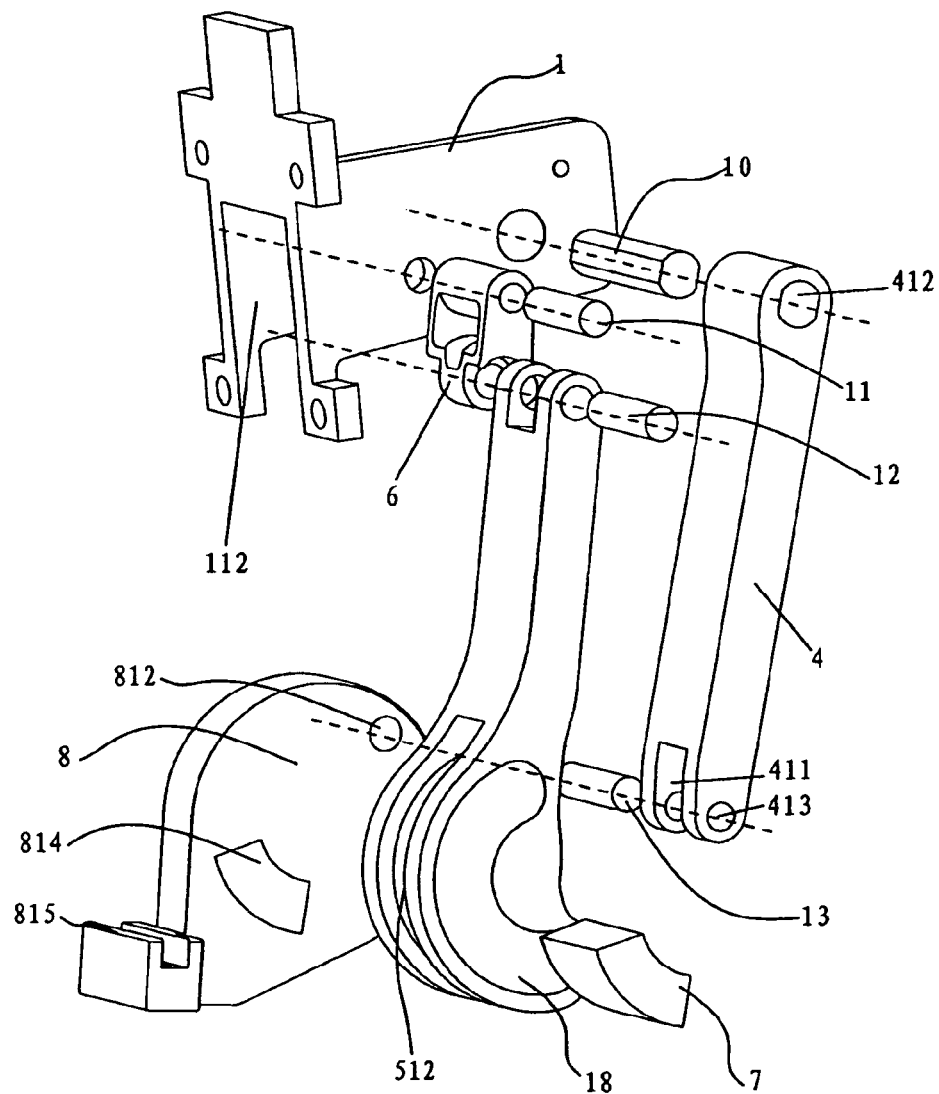
FIG. 5 is an exploded schematic view of a third embodiment of the extending and retracting device for a vehicle step apparatus of the present invention.

With reference to FIG. 5, a third embodiment of the extending and retracting device for a vehicle step apparatus of the present invention will now be described. Those having ordinary skill in the related art should appreciate that structure and operation of the third embodiment is similar to those of the first embodiment. Accordingly, the description that follows focuses upon differences between the first and third embodiments.

In the third embodiment, the mounting bracket 1 is formed with a recess 112, and the respective upper end portions of the third arm 6 and first arm 4 are inserted into the recess 112 and pivotably connected to the mounting bracket 1 via corresponding pins 11, 10. The lower end portion of the first arm 4 is formed with groove 411. The lower end portion of the second arm 5 is formed with groove 512. The step bracket 8 is inserted into grooves 411, 512.

A pair of side walls are formed in the step bracket 8, and the arc-sliding member 7 is mounted onto the step bracket 8 and extended laterally and outwardly into the arc slot 18 from the side walls. In particular, the step bracket 8 is formed with through-hole 814, and the arc-sliding member 7 is received in through-hole 814 and mounted onto the step bracket 8 such that both ends of the arc-sliding member 7 are extended laterally into the arc slot 18 located at both sides of groove 512. Since the lower end portion of the second arm 5 is formed with groove 512, the arc slot 18 is divided into two portions by groove 512. Both ends of the arc-sliding member 7 are extended laterally into the arc slot 18 located at both sides of groove 512 and slidable in the arc slot 18 such that the lower end portion of the second arm 5 is rotatable with respect to the step bracket 8. The step bracket 8 is also inserted into groove 411 and pivotably connected to the lower end portion of the first arm 4 via pin 13.

With reference to FIGS. 6 and 7, a fourth embodiment of the extending and retracting device for a vehicle step apparatus of the present invention will now be described. Those having ordinary skill in the related art should appreciate that structure and operation of the fourth embodiment is similar to those of the first, second, or third embodiment. Accordingly, the description that follows focuses upon differences between the first, second, or third and fourth embodiments.

In the fourth embodiment, the upper end portion of the third arm 6 is formed with groove 613, the upper end portion of the first arm 4 is formed with groove 410, and the lower end portion of the first arm 4 is formed with groove 411. The mounting bracket 1 is inserted into grooves 613, 410 and pivotably connected to the third arm 6 and first arm 4 via corresponding pins 11, 10.

The lower end portion of the second arm 5 is formed with groove 512, and the step bracket 8 is inserted into groove 512. The arc-sliding member 7 includes a first arc-sliding member 7a and a second arc-sliding member 7b. The step bracket 8 is formed with through-holes 811, 812, 813. The first arc-sliding member 7a is formed with through-holes 711a, 712a, and the second arc-sliding member 7b is formed with screw holes 711b, 712b. As shown in FIG. 7, the first arc-sliding member 7a and second arc-sliding member 7b are mounted respectively to the pair of side walls of the step bracket 8 via bolts 16, 17.

Of course, during mounting, the step bracket 8 is inserted into grooves 512, 411. Pin 13 is received in through-holes 413, 812 such that the lower end portion of the first arm 4 is pivotably connected to the step bracket 8. The first arc-sliding member 7a and second arc-sliding member 7b are passed respectively through the arc slots 18 from a corresponding pair of side walls of the lower end portion of the second arm 5 and slidable in the arc slots 18. The first arc-sliding member 7a and second arc-sliding member 7b are mounted to the step bracket 8 via bolts 16, 17, such that the lower end portion of the second arm 5 is rotatable with respect to the step bracket 8.

Figure 8:
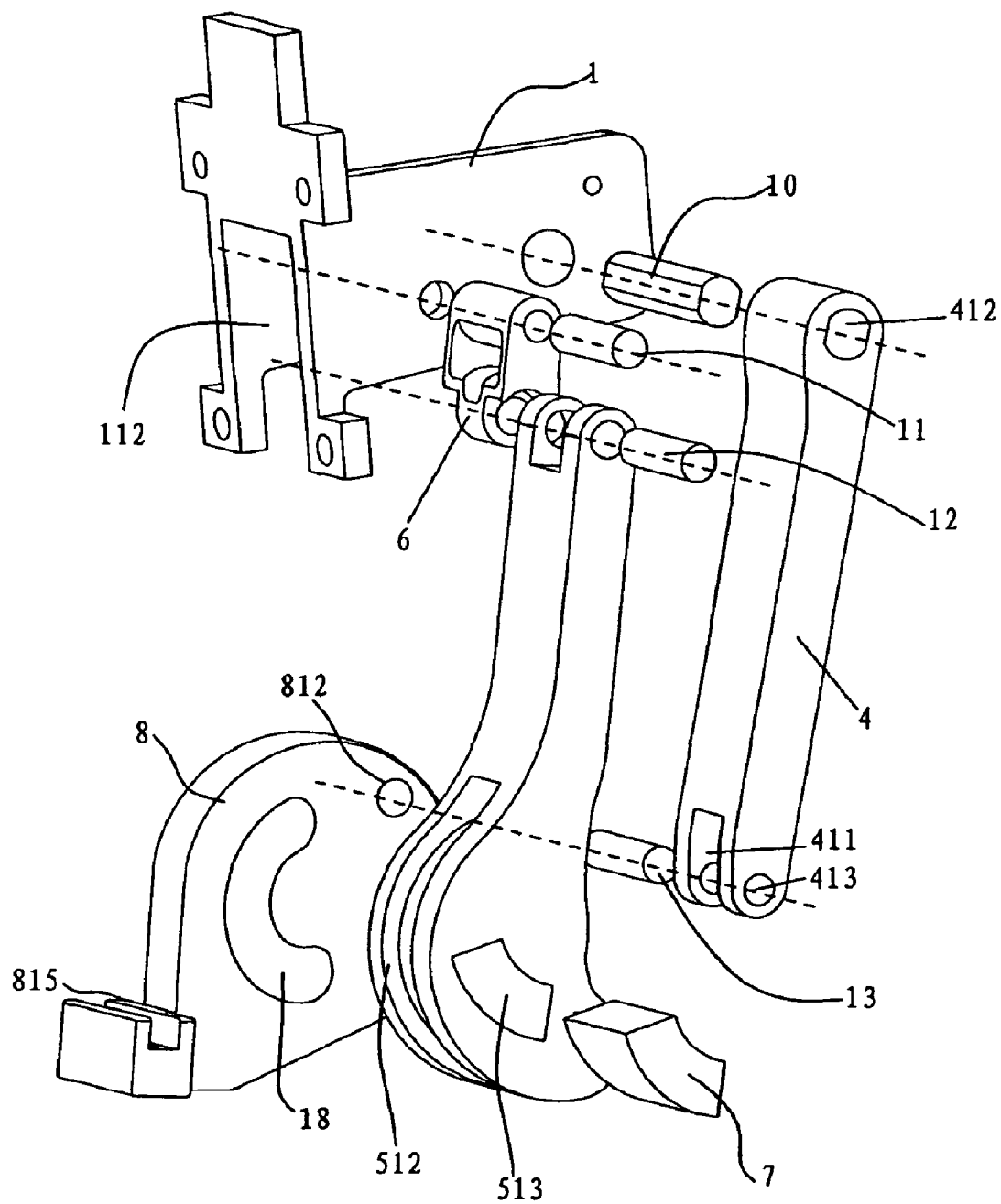
FIG. 8 is an exploded schematic view of a fifth embodiment of the extending and retracting device for a vehicle step apparatus of the present invention.

With reference to FIG. 8, a fifth embodiment of the extending and retracting device for a vehicle step apparatus of the present invention will now be described. Those having ordinary skill in the related art should appreciate that structure and operation of the fifth embodiment is similar to those of the third embodiment. Accordingly, the description that follows focuses upon differences between the third and fifth embodiments.

In the fifth embodiment, the arc slot 18 is formed in the step bracket 8, and the arc-sliding member 7 is mounted onto the lower portion of the second arm 5. The lower end portion of the second arm 5 is formed with groove 512 and through-hole 513, the axial direction of through-hole 513 being identical with the lateral direction of groove 512. The step bracket 8 is inserted into groove 512, and the arc-sliding member 7 is laterally received in through-hole 513 and the arc slot 18 and mounted onto the lower end portion of the second arm 5 so that the lower end portion of the second arm 5 is rotatable with respect to the step bracket 8.

Figure 9:
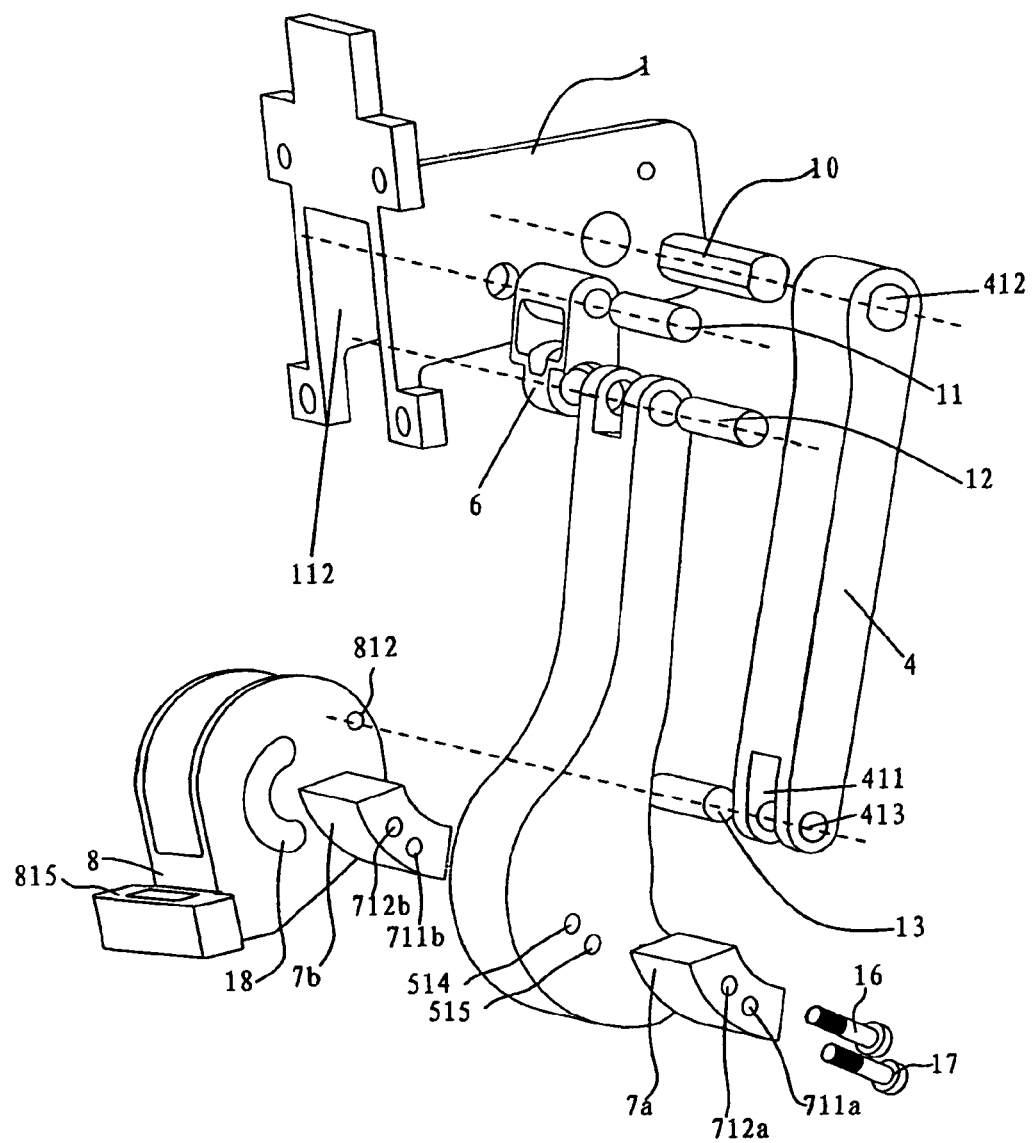
FIG. 9 is an exploded schematic view of a sixth embodiment of the extending and retracting device for a vehicle step apparatus of the present invention.

With reference to FIG. 9, a sixth embodiment of the extending and retracting device for a vehicle step apparatus of the present invention will now be described. Those having ordinary skill in the related art should appreciate that structure and operation of the sixth embodiment is similar to those of the fourth embodiment. Accordingly, the description that follows focuses upon differences between the fourth and sixth embodiments.

In the sixth embodiment, the arc slot 18 is formed in the step bracket 8 and divided into a pair of portions. The arc-sliding member 7 is mounted onto the lower portion of the second arm 5. The arc-sliding member 7 includes a first arc-sliding member 7a and a second arc-sliding member 7b. The first arc-sliding member 7a and second arc-sliding member 7b are mounted onto a pair of side walls of the lower end portion of the second arm 5. The lower portion of the second arm 5 is formed with through-holes 514, 515. The first arc-sliding member 7a is formed with through-holes 711a, 712a, and the second arc-sliding member 7b is formed with screw holes 711b, 712b. The bolts 16, 17 are, in turn, passed through the first arc-sliding member 7a, through-holes 515, 514, and the second arc-sliding member 7b such that the first arc-sliding member 7a and second arc-sliding member 7b are mounted respectively to the side walls of and slidable in the lower portion of the second arm 5. Therefore, the second arm 5 is rotatable with respect to the step bracket 8.

In addition, the mounting bracket 1 is formed with a recess 112. The respective upper end portions of the third arm 6 and first arm 4 are inserted into the recess 112 and pivotably connected to the mounting bracket 1 via corresponding pins 11, 10.

Figure 10:
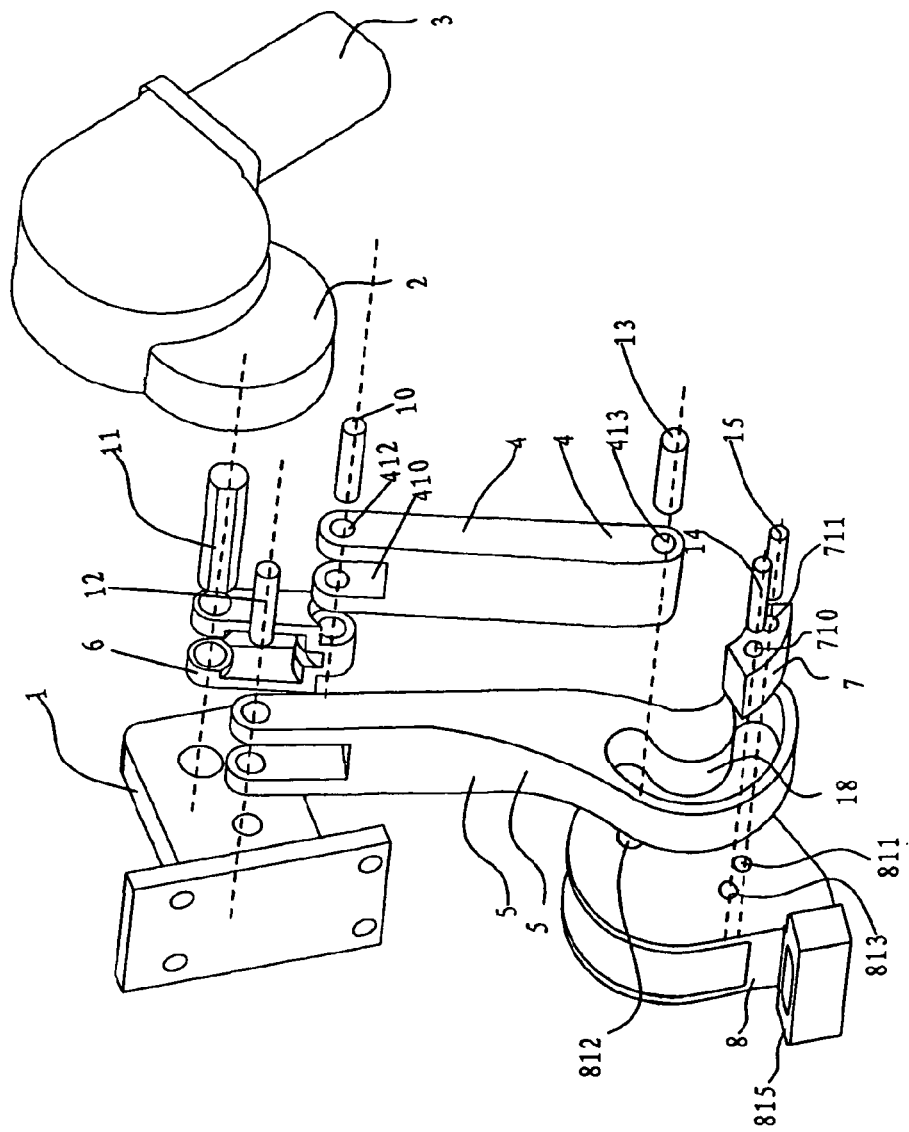
FIG. 10 is an exploded schematic view of a seventh embodiment of the extending and retracting device for a vehicle step apparatus of the present invention.

With reference to FIG. 10, a seventh embodiment of the extending and retracting device for a vehicle step apparatus of the present invention will now be described. Those having ordinary skill in the related art should appreciate that structure and operation of the seventh embodiment is similar to those of the first embodiment. Accordingly, the description that follows focuses upon differences between the first and seventh embodiments.

In the seventh embodiment, the lower end portion of the third arm 6 is rotatably connected to the upper end portion of the first arm 4. The upper end portion of the first arm 4 is formed with groove 410, and the lower end portion of the third arm 6 is inserted into groove 410 and pivotably connected to the upper end portion of the first arm 4 via pin 10. The upper end portion of the third arm 6 is formed with groove 613. The upper end portion of the second arm 5 is formed with groove 510. The mounting bracket 1 is inserted into grooves 613, 510 and pivotably connected to the respective upper end portions of the third arm 6 and second arm 5 via pins 11, 12.

Figure 11:
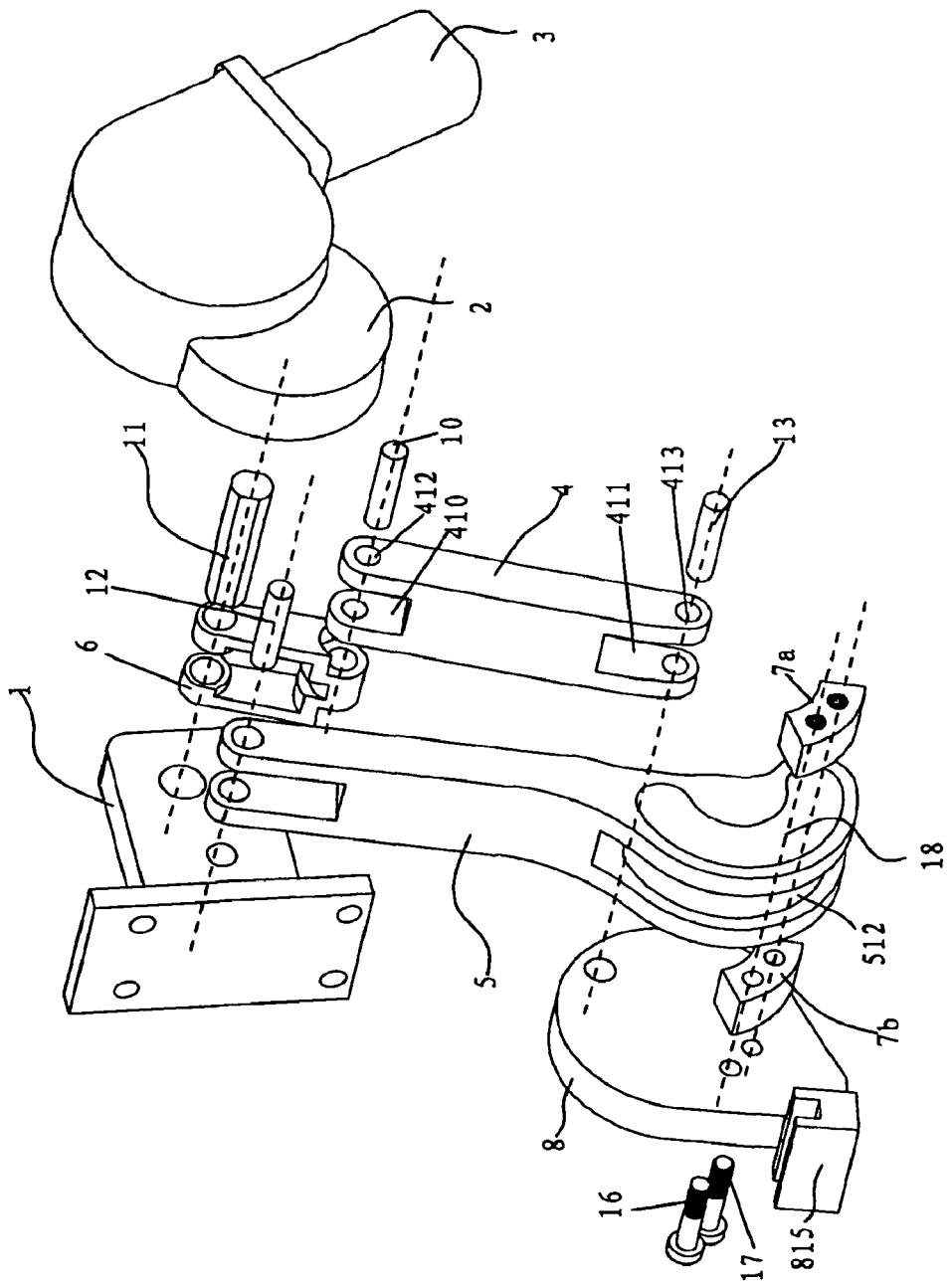
FIG. 11 is an exploded schematic view of an eight embodiment of the extending and retracting device for a vehicle step apparatus of the present invention.

With reference to FIG. 11, an eighth embodiment of the extending and retracting device for a vehicle step apparatus of the present invention will now be described. Those having ordinary skill in the related art should appreciate that structure and operation of the eighth embodiment is similar to those of the fourth embodiment. Accordingly, the description that follows focuses upon differences between the fourth and eighth embodiments.

In the eighth embodiment, the lower end portion of the third arm 6 is rotatably connected to the upper end portion of the first arm 4. The upper end portion of the first arm 4 is formed with groove 410, and the lower end portion of the third arm 6 is inserted into groove 410 and pivotably connected to the upper end portion of the first arm 4 via pin 10. The upper end portion of the third arm 6 is formed with groove 613. The upper end portion of the second arm 5 is formed with groove 510. The mounting bracket 1 is inserted into grooves 613, 510 and pivotably connected to the respective upper end portions of the third arm 6 and second arm 5 via corresponding pins 11, 12.

It should be understood by those having ordinary skill in the related art that in each of the second through eighth embodiments of the extending and retracting device, each of the first and second arc-sliding members 7a, 7b, pins 10, 11, 12, 13, bolts 16, 17, and respective pairs of side walls of the step bracket 8 and lower end portion of the second arm 5 can have any suitable shape, size, and structure. It should also be appreciated that each of the recess 112, through-holes 413, 513, 514, 515, 711a, 712a, 811, 812, 813, 814, grooves 410, 411, 510, 512, 613, and screw holes 711b, 712b can have any suitable shape and size. It should also be appreciated that each of the first and second arc-sliding members 7a, 7b, pins 10, 11, 12, 13, bolts 16, 17, respective pairs of side walls of the step bracket 8 and lower end portion of the second arm 5, recess 112, through-holes 413, 513, 514, 515, 711a, 712a, 811, 812, 813, 814, grooves 410, 411, 510, 512, 613, and screw holes 711b, 712b can have any suitable structural relationship with each other and the step member 9 and body of the vehicle.

With reference to FIGS. 12-14, a first embodiment of the vehicle step apparatus of the present invention will now be described. In general, this embodiment of the vehicle step apparatus includes a step member 9, first and second extending and retracting devices connected to the step member 9 for moving the step member between an extended position (as shown in FIG. 13) and a retracted position (as shown in FIG. 14). Each of the first and second extending and retracting devices includes a mounting bracket 1 adapted to be fixed to a body of a vehicle (not shown). A step bracket 8 is connected to the step member 9. A first arm 4 defines a lower end portion and an upper end portion. The lower end portion is rotatably connected to the step bracket 8. A second arm 5 defines a lower end portion and an upper end portion. The lower end portion is connected to the step bracket 8. A third arm 6 defines an upper end portion rotatably connected to the mounting bracket 1 and a lower end portion rotatably connected to the upper end portion of one of the first arm 4 or second arm 5. The upper end portion of other of the first arm 4 or second arm 5 is rotatably connected to the mounting bracket 1. At least one arc-sliding member 7 is mounted to the step bracket 8. At least one arc slot 18 is formed in the lower end portion of the second arm 5. The arc-sliding member 7 is adapted to fit respectively into the arc slot 18 so as to be slidable in the arc slot 18 so that the lower end portion of the second arm 5 is rotatable with respect to the step bracket 8. The vehicle step apparatus also includes first and second driving devices that drive respectively the first and second extending and retracting devices to move the step member 9 between the extended and retracted positions.

More specifically, the mounting bracket 1 can be mounted to the body of the vehicle so as to mount the extending and retracting devices to the vehicle. The step member 9 is mounted onto the step brackets 8 of the respective extending and retracting devices. The lower end portion of the first arm 4 is pivotably connected to the step bracket 8 via pin 13. The upper end portion of the first arm 4 is rotatably connected to the mounting bracket 1. In particular, the upper end portion of the first arm 4 is pivotably connected to the mounting bracket 1 via pin 10. The upper end portion of the third arm 6 is pivotably connected to the mounting bracket 1 via pin 11. As shown in FIG. 12, the lower end portion of the third arm 6 is rotatably connected to the upper end portion of the second arm 5. In particular, the lower end portion of the third arm 6 is pivotably connected to the upper end portion of the second arm 5 via pin 12.

In one embodiment, each of the driving devices includes a reversible motor 3 and a speed reducer 2. In particular, the reversible motors 3 drive respectively the first arms 4 via the corresponding speed reducers 2 so as to move the extending and retracting devices between the extended and retracted states, thus moving the step member 9 between the extended and retracted positions. Each of the driving devices is not limited to drive the first arm 4 and can drive the second arm 5 or third arm 6. As shown in FIGS. 12-14 and not by way of limitation, the driving devices drive respectively the first arms 4 of the corresponding extending and retracting devices.

In operation of the first embodiment of the vehicle step apparatus and as shown in FIG. 13, the vehicle step apparatus is in the extended state in which the step member 9 is in the extended position. The reversible motors 3 drive respectively the first arms 4 of the extending and retracting devices via the corresponding speed reducers 2 to rotate the first arms 4 in counterclockwise direction relative to the mounting brackets 1, thereby driving the second arms 5 and third arms 6 to rotate in counterclockwise direction relative to the mounting brackets 1 so that the step brackets 8 move upwardly and rearwardly relative to the mounting brackets 1. In this way, the extending and retracting devices move from the extended state (as shown in FIG. 13) to the retracted state (as shown in FIG. 14) while the step member 9 moves from the extended position (as shown in FIG. 13) to the retracted position (as shown in FIG. 14). When the step member 9 is moved from the retracted to extended position so that a passenger may use the step member 9, the reversible motors 3 drive respectively the first arms 4 via the corresponding speed reducers 2 to rotate the first arms 4 in the clockwise direction relative to the mounting brackets 1 so that the extending and retracting devices move from the retracted state (as shown in FIG. 14) to the extended state (as shown in FIG. 13), and the step member 9 moves from the retracted position (as shown in FIG. 14) to the extended position (as shown in FIG. 13) for a passenger stepping on the step member 9.

If rotation of the reversible motor 3 of the first driving device is not synchronous with that of the second driving device and/or rotation of the first extending and retracting device is not synchronous with that of the second extending and retracting device, such asynchronization can be compensated for by relative rotation between the second arms 5 and third arms 6, thus eliminating interference of the first extending and retracting device with the second extending and retracting device. In other words, the vehicle step apparatus employs a five-link mechanism, which increases freedom of movement of each extending and retracting device, and eliminates interference so that operation life and reliability of the vehicle step apparatus and extending and retracting device therefor are increased. Because two driving devices are used to drive respectively two extending and retracting devices, resulting driving forces are increased, and operation of the vehicle step apparatus is very stable.

Furthermore, the lower end portion of the second arm 5 is rotatably connected to the step bracket 8 by the arc-sliding member 7 fitted in the arc slot 18. In this way, an area of stress of the arc-sliding member 7 is large, thus eliminating concentration of the stress. In addition, operational life of the arc-sliding member 7 is increased so that the vehicle step apparatus does not easily fail. Moreover, when a passenger steps on the step member 9, the extending and retracting device can be in a balanced state by means of a self-locking force so that structure of the vehicle step apparatus is simple.

Figure 15:
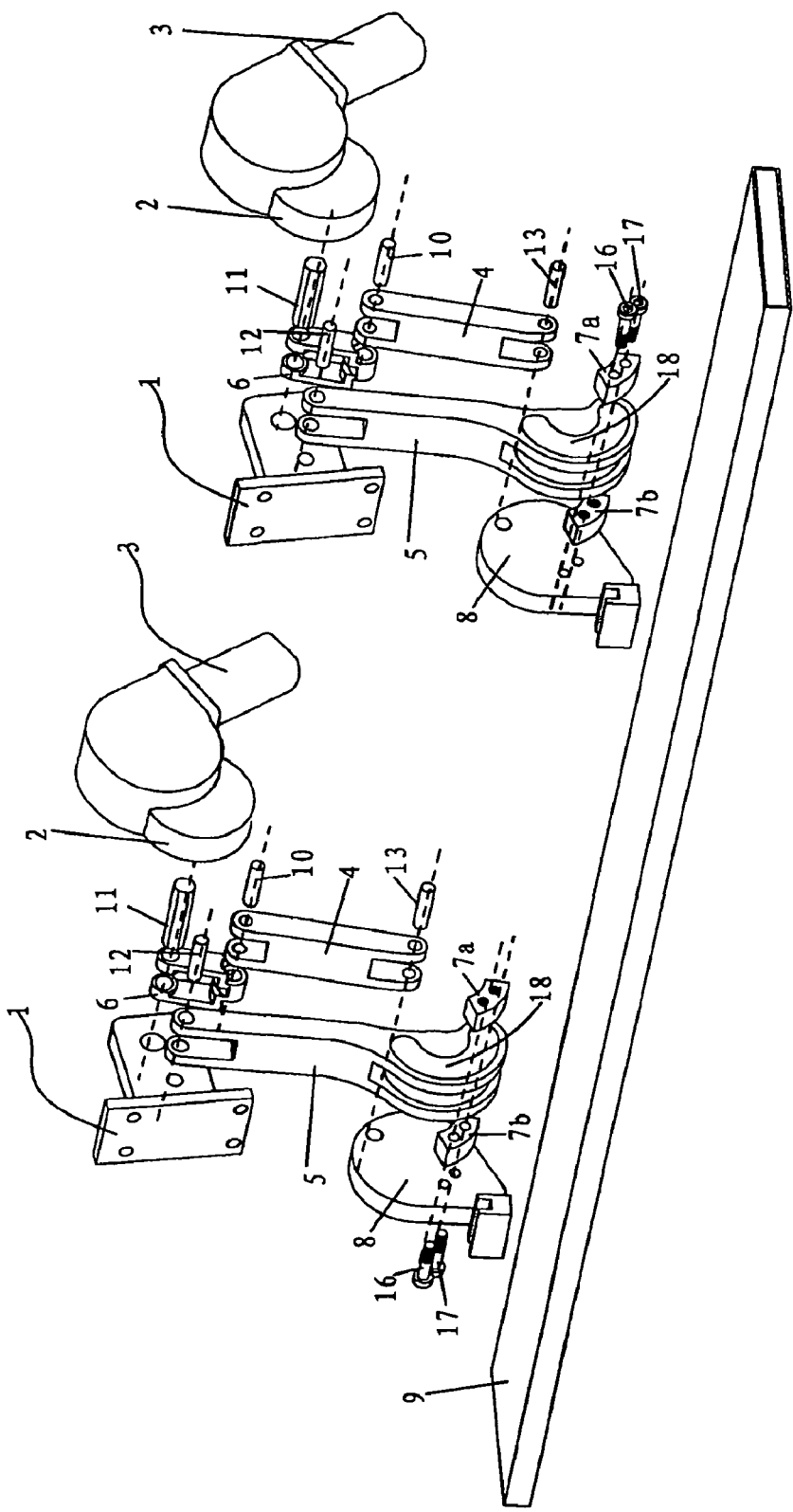
FIG. 15 is an exploded schematic view of a second embodiment of a vehicle step apparatus with the extending and retracting device of the present invention.

With reference to FIG. 15, a second embodiment of the vehicle step apparatus of the present invention will now be described. Those having ordinary skill in the related art should appreciate that structure and operation of the second embodiment is similar to those of the first embodiment. Accordingly, the description that follows focuses upon differences between the first and second embodiments.

With respect to each of the extending and retracting devices, the lower end portion of the third arm 6 is rotatably connected to the upper end portion of the first arm 4. The upper end portion of the third arm 6 is rotatably connected to the mounting bracket 1, and the lower end portion of the first arm 4 is rotatably connected to the step bracket 8. The upper end potion of the second arm 5 is rotatably connected directly to the mounting bracket 1, and the lower end portion of the second arm 5 is rotatably connected to the step bracket 8. The reversible motors 3 drive respectively the third arms 6 via the corresponding speed reducers 2. In addition, the lower end portion of the second arm 5 is formed with groove 512, and the step bracket 8 is inserted into groove 512. Moreover, the arc-sliding member 7 includes a first arc-sliding member 7a and a second arc-sliding member 7b that are mounted respectively to a pair of side walls of the step bracket 8 via bolts 16, 17. Asynchronization between the extending and retracting devices and/or reversible motors 3 can be compensated for by relative rotation between the third arms 6 and first arms 4, thus eliminating interference of the first extending and retracting device with the second extending and retracting device and increasing operational life thereof. The vehicle step apparatus can operate very stably, and its reliability is increased.

As shown in FIG. 12, the vehicle step apparatus of the first embodiment employs two extending and retracting devices of the first embodiment of the present invention. That is, the extending and retracting devices are identical with each other. As shown in FIG. 15, the vehicle step apparatus of the second embodiment employs two extending and retracting devices of the sixth embodiment of the present invention. That is, the extending and retracting devices are identical with each other. However, those having ordinary skill in the related art should appreciate that the extending and retracting devices can be different from each other. For example, the first extending and retracting device can be any of the first through eighth embodiments of the extending and retracting device of the present invention, and the second extending and retracting device can be any of such embodiments as well.

It should be appreciated by those having ordinary skill in the related art that in each of the first and second embodiments of the vehicle step apparatus, each of the mounting brackets 1, speed reducers 2, reversible motors 3, first arms 4, second arms 5, third arms 6, arc-sliding member(s) 7, 7a, 7b, step brackets 8, step member 9, pins 10, 11, 12, 13, bolts 16, 17, pair of side walls of the step bracket 8, and driving devices can have any suitable shape, size, and structure. It should also be appreciated that each of the arc slot(s) 18 and groove 512 can have any suitable shape and size. It should also be appreciated that the mounting brackets 1, speed reducers 2, reversible motors 3, first arms 4, second arms 5, third arms 6, arc-sliding member(s) 7, step brackets 8, step member 9, pins 10, 11, 12, 13, bolts 16, 17, arc slot(s) 18, groove 512, pair of side walls of the step bracket 8, and driving devices can have any suitable structural relationship with each other and the body of the vehicle.

The vehicle step apparatus of the present invention employs a five-link mechanism, is reliable and stable with a long operational life, and eliminates interference occurring between the two extending and retracting devices. Also, freedom of movement of the vehicle step apparatus is increased, when compared to conventional four-link mechanisms, and the vehicle step apparatus employs the two driving devices to drive respectively the two extending and retracting devices with increased driving force. And, even if rotations of the two driving devices and/or extending and retracting devices are not synchronous, asynchronization can be compensated by relative rotation between the third arm and first or second arm. Furthermore, the arc-sliding member(s) 7 and arc slot(s) 18 are cost-effective and efficient to facilitate extending and retracting action of the vehicle-step apparatus. In addition, end portions of each arc slot 18 limit movement of the corresponding arc-sliding member 7 within the arc slot 18 and buffer impact of the arc-sliding member 7 against the arc slot 18. Moreover, the vehicle step apparatus produces an internal self-locking force that produces a balanced stage when the vehicle step apparatus is in an extended position. Plus, the arc-sliding member(s) 7 and arc slot(s) 18 eliminate stress concentration so that useful life of the vehicle step apparatus is long. The vehicle step apparatus distributes stress evenly with a buffering structure that is structurally simple and is relatively lightweight and more aesthetically pleasing as well.

The present invention has been described in an illustrative manner. It is to be understood that the terminology that has been used is intended to be in the nature of words of description rather than of limitation. Many modifications and variations of the present invention are possible in light of the above teachings. Therefore, within the scope of the appended claims, the present invention may be practiced other than as specifically described.

What is claimed is:

1. An extending and retracting device for a vehicle step apparatus comprising:
   a mounting bracket fixed to a body of a vehicle;
   a step bracket connected to a step member of the vehicle step apparatus;
   a first arm defining a lower end portion thereof rotatably connected directly to said step bracket and an upper end portion thereof;
   a second arm defining a lower end portion thereof connected to said step bracket and an upper end portion thereof;
   a third arm defining an upper end portion thereof rotatably connected to said mounting bracket and a lower end portion thereof rotatably connected directly to said upper end portion of one of said first and second arms, wherein said upper end portion of other of said first and second arms is rotatably connected to said mounting bracket;
   at least one arc-sliding member mounted to one of said step bracket and said lower end portion of said second arm; and
   at least one arc slot formed in the other of said step bracket and said lower end portion of said second arm, wherein said arc-sliding member fits into corresponding said arc slot so as to be slidable in said arc slot so that said lower end portion of said second arm is rotatable with respect to said step bracket.

2. An extending and retracting device for a vehicle step apparatus as set forth in claim 1, wherein at least one side wall is formed in said step bracket and said arc-sliding member is mounted to one of said side walls and extended laterally and outwardly into said arc slot so that said step bracket is juxtaposed and connected to said lower end portion of said second arm.

3. An extending and retracting device for a vehicle step apparatus as set forth in claim 1, wherein said lower end portion of said second arm is formed with a groove, said step bracket is inserted into said groove, and said arc-sliding member is mounted in said groove so as to pass through said arc slot.

4. An extending and retracting device for a vehicle step apparatus as set forth in claim 1, wherein said lower end portion of said second arm is formed with a groove, said step bracket is inserted into said groove, a pair of side walls are formed in said step bracket, and said arc-sliding members are mounted respectively to said pair of side walls and extended laterally and outwardly into corresponding said arc slots.

5. An extending and retracting device for a vehicle step apparatus as set forth in claim 1, wherein said lower end portion of said third arm is rotatably connected to said upper end portion of said second arm.

6. An extending and retracting device for a vehicle step apparatus as set forth in claim 1, wherein said lower end portion of said third arm is rotatably connected to said upper end portion of said first arm.

7. A vehicle step apparatus comprising:

a step member;

first and second extending and retracting devices connected to said step member for moving said step member between an extended position and a retracted position, wherein each of said first and second extending and retracting devices includes:

a mounting bracket fixed to a body of a vehicle;

a step bracket connected to said step member;

a first arm defining a lower end portion thereof rotatably connected directly to said step bracket and an upper end portion thereof;

a second arm defining a lower end portion thereof connected to said step bracket and an upper end portion thereof;

a third arm defining an upper end portion thereof rotatably connected to said mounting bracket and a lower end portion thereof rotatably connected directly to said upper end portion of one of said first and second arms, wherein said upper end portion of other of said first and second arms is rotatably connected to said mounting bracket;

at least one arc-sliding member mounted to said step bracket; and at least one arc slot formed in said lower end portion of said second arm, wherein said arc-sliding member fits respectively into said arc slot so as to be slidable in said arc slot so that said lower end portion of said second arm is rotatable with respect to said step bracket; and first and second driving devices that drive respectively said first and second extending and retracting devices to move said step member between said extended and retracted positions.

8. A vehicle step apparatus as set forth in claim 7, wherein at least one side wall is formed in said step bracket and said arc-sliding member is mounted to one of said side walls and extended laterally and outwardly into said arc slot so that said step bracket is juxtaposed and connected to said lower end portion of said second arm.

9. A vehicle step apparatus as set forth in claim 7, wherein said lower end portion of said second arm is formed with a groove, said step bracket is inserted into said groove, and said arc-sliding member is mounted in said groove so as to pass through said arc slot.

10. A vehicle step apparatus as set forth in claim 7, wherein said lower end portion of said second arm is formed with a groove, said step bracket is inserted into said groove, a pair of side walls are formed in said step bracket, and said arc-sliding members are mounted respectively to said pair of side walls and extended laterally and outwardly into corresponding said arc slots.

11. A vehicle step apparatus as set forth in claim 7, wherein said lower end portion of said third arm is rotatably connected to said upper end portion of said second arm.

12. A vehicle step apparatus as set forth in claim 7, wherein said lower end portion of said third arm is rotatably connected to said upper end portion of said first arm.

13. A vehicle step apparatus as set forth in claim 7, wherein each of said first and second driving devices drives any of said first, second, and third arms of respective said first and second extending and retracting devices to move said step member between said extended and retracted positions.

* * * * *